P. BARDUCCI.
APPARATUS FOR ARRANGING MACARONI OR LIKE ALIMENTARY PASTES ON RODS OR THE LIKE.
APPLICATION FILED NOV. 4, 1915.

1,257,966.

Patented Mar. 5, 1918.
4 SHEETS—SHEET 1.

Pia de Barducci
Inventor, by Carrera Langues
Attorney.

P. BARDUCCI.
APPARATUS FOR ARRANGING MACARONI OR LIKE ALIMENTARY PASTES ON RODS OR THE LIKE.
APPLICATION FILED NOV. 4, 1915.
1,257,966.
Patented Mar. 5, 1918.
4 SHEETS—SHEET 2.
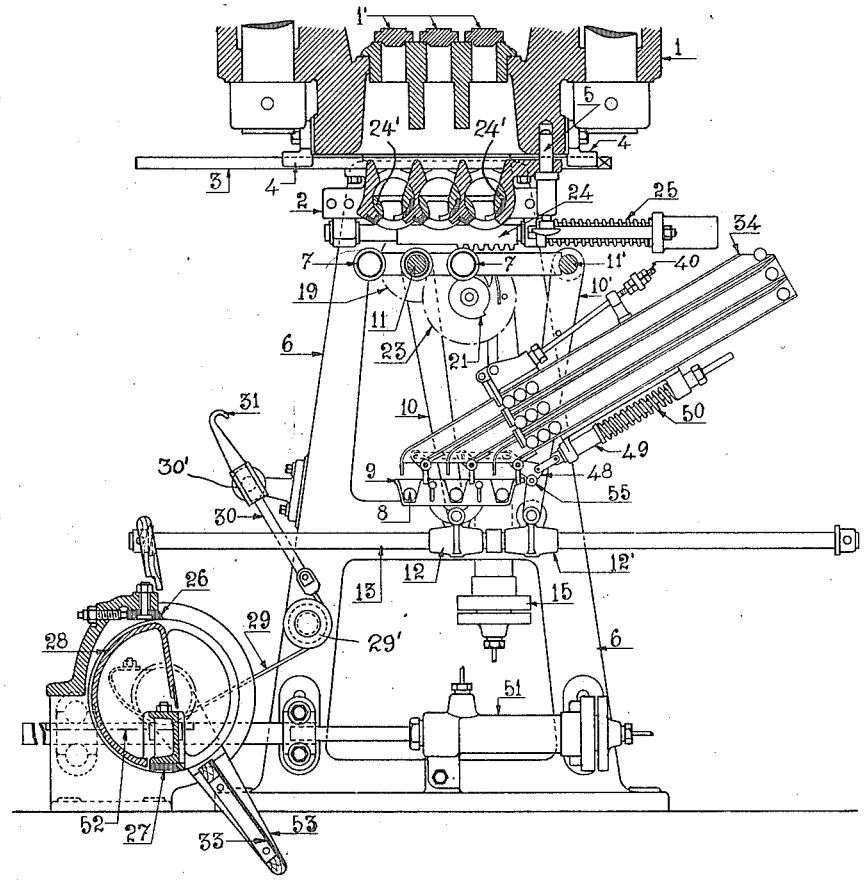
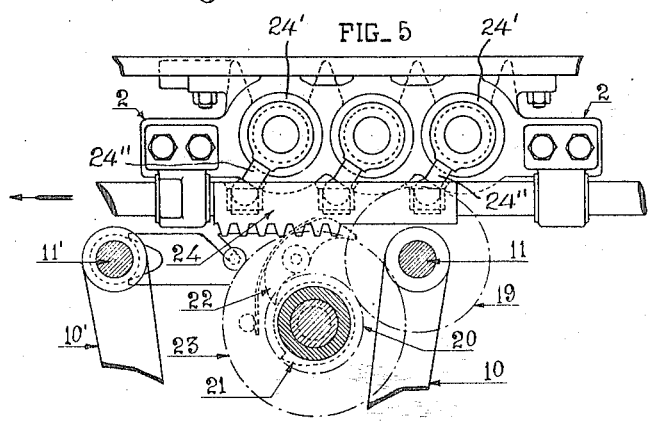

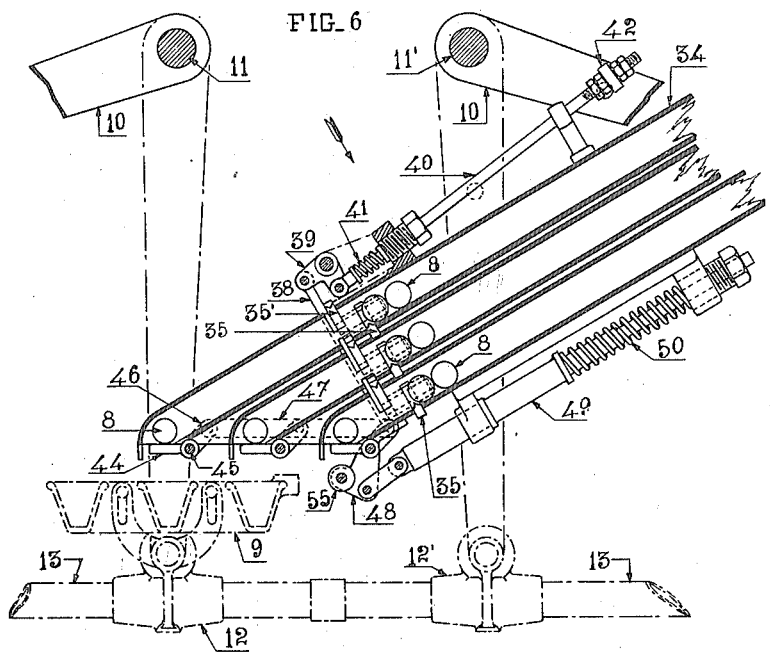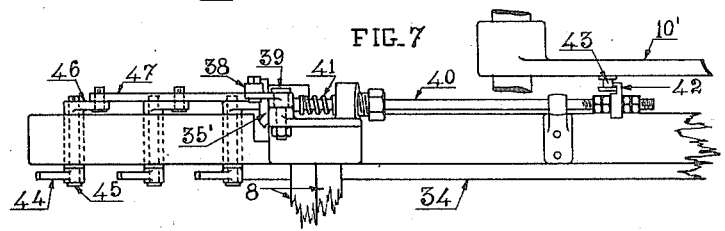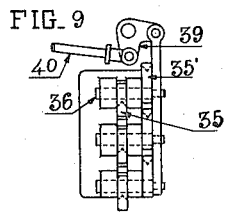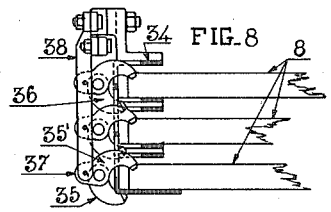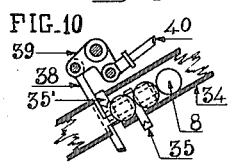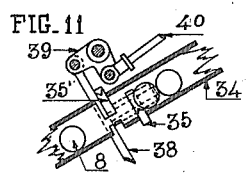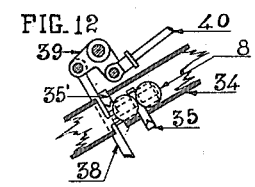

P. BARDUCCI.
APPARATUS FOR ARRANGING MACARONI OR LIKE ALIMENTARY PASTES ON RODS OR THE LIKE.
APPLICATION FILED NOV. 4, 1915.
1,257,966.
Patented Mar. 5, 1918.
4 SHEETS—SHEET 4.
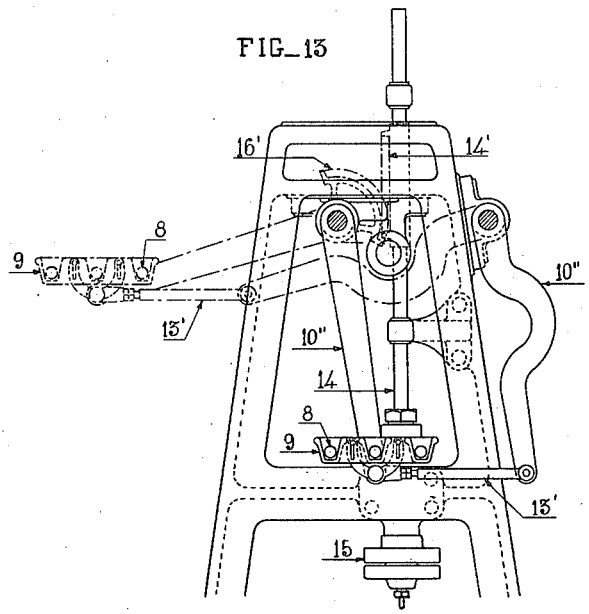
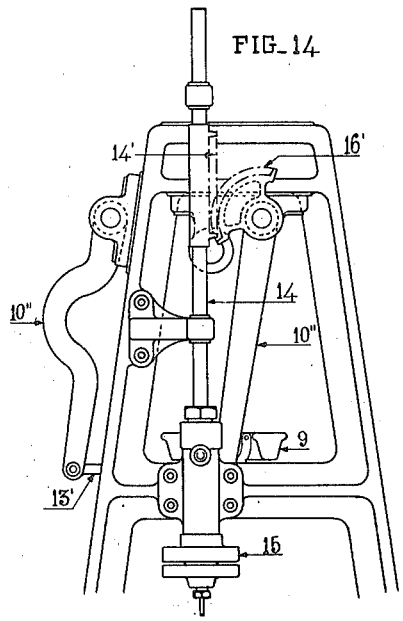

UNITED STATES PATENT OFFICE.

PILADE BARDUCCI, OF NAPLES, ITALY.

APPARATUS FOR ARRANGING MACARONI OR LIKE ALIMENTARY PASTES ON RODS OR THE LIKE.

1,257,966.      Specification of Letters Patent.      Patented Mar. 5, 1918.

Application filed November 4, 1915. Serial No. 59,611.

*To all whom it may concern:*

Be it known that I, PILADE BARDUCCI, a subject of the King of Italy, residing at Naples, Italy, have invented certain new and useful Improvements in Apparatus for Arranging Macaroni or like Alimentary Pastes on Rods or the like, of which the following is a specification.

Machines are known comprising one or more rotating frames having rods on which macaroni or like alimentary pastes drawn out in form of long tubes or threads are set but the operation of said machines is not a satisfactory one, particularly when a plurality of rows of pastes are issuing from the dies of the press each row requiring of being set on its proper rod; furthermore difficulties have been encountered for the mounting and operation of the apparatus intended to cut the threads or tubes and finally they require of arranging the rods on the frame or frames by hand.

This invention has for its object an improved apparatus by means of which the rows of threads or tubes of paste issuing from the dies are automatically set on their respective rods and are properly cut, the rods being supplied by an automatic apparatus which arranges them in the required position.

In the drawings is shown by way of example one construction of the apparatus according to this invention and:—

Fig. 2 is a longitudinal central section,

Figure 4:
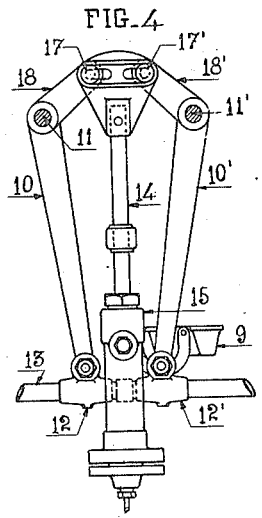

Fig. 4 is a detail view of the device which effects the raising of the rod carriers, seen from the outside, Fig. 5 is a detail of the device controlling the cutting apparatus in proper relation with the movement of the rods, Fig. 6 is a detail view of the apparatus for feeding the rods, Fig. 7 is a view of said apparatus seen in the direction of the arrow of Fig. 6, Fig. 8 is a front view of the device controlling the descent of the rods, Fig. 9 is the corresponding side view, Figs. 10, 11 and 12 illustrate said device in three different positions of operation, Fig. 13 is a front view of another construction of the mechanism for raising the rods, and Fig. 14 is the rear view of the same.

The apparatus is intended to coöperate with a drawing press of any suitable type from which the threads or tubes of paste are issuing, said threads being arranged in one or in a plurality of rows and being properly cut at their ends in order to obtain sections of the required length.

Figure 1:
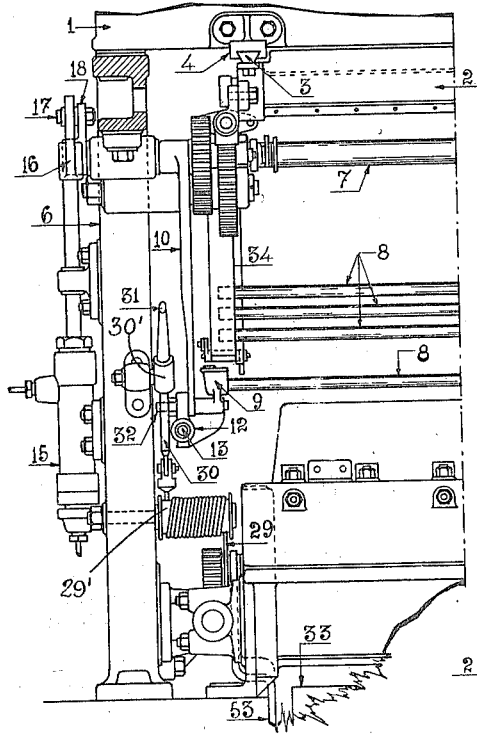
Figure 1 is an end front view of the apparatus.
Figure 3:
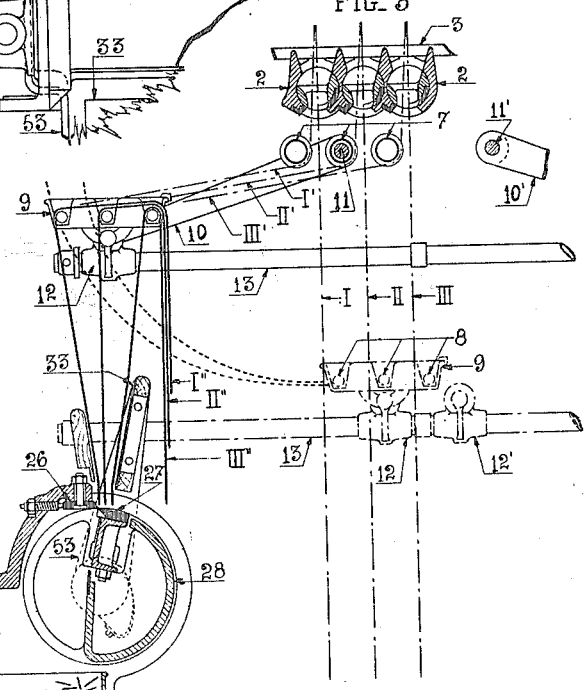
Fig. 3 shows the parts of the apparatus in another position.

According to the arrangement shown in Figs. 1, 2, and 3, the cutting device 2 is arranged under the frame of the press 1 and is so mounted as to be readily removed; in the construction illustrated it is secured by means of rods 3 engaged in lugs 4 and stopped by means of the pin 5.

Under the cutting apparatus 2, rollers 7 are mounted on the side frames 6 of the machine, each of which corresponds to one of the rows of paste threads or tubes issuing from the press 1 and is arranged sidewise with regard to the normal position of the corresponding row of threads.

The rods 8 are arranged under the rollers 7; each of said rods corresponds to one of the rollers 7 and is arranged on the opposite side of the corresponding roller with regard to the row of threads issuing from the press. They are engaged by their ends in the forks 9 pivoted to the arms 10 which are solid with the ends of a shaft 11; this latter, in the construction illustrated, serves also as the pivot of one of the rollers.

On the other hand each fork 9 is solid with a sleeve 12 encircling a rod 13 passing also in another sleeve 12' connected by means of an arm 10' to a shaft 11' parallel to shaft 11. The arms 10 and 10' are arranged symmetrical with regard to a rod 14 articulated with them and actuated by a hydraulic pressure cylinder 15 (Fig. 4). The upper end of said rod is secured to the head 16 provided with slots in which are engaged the pins 17, 17' of the rods 18, 18', solid with shafts 11 and 11' respectively.

It is obvious that by lowering the head 16 by means of the rod 14 and hydraulic cylinder 15, the arms 10 and 10' move away from each other and the fork 9 is raised while retaining its proper direction as the sleeves 12 and 12' are maintained horizontal by the rod 13 passing through them.

When also the sleeve 12' is provided with a fork 9, two forks are operated by means of said arrangement, the rod feeding apparatus being in this case omitted.

The same operation of the fork may be obtained by mounting it on the connecting rod of a four bar mechanism, as shown in Figs. 13 and 14. Said mechanism comprises two arms 10″ pivoted by their upper ends to the stationary frame of the machine, their lower ends being connected by a rod 13′. One of said arms 10″ is solid with a toothed segment 16′ which is mounted on the pivot of said arm and engaged by a toothed bar 14′ carried by the arm 14 solid with the rod of a piston sliding in cylinder 15.

As described the fork 9 together with its rods 8 may pass from the lower position shown in dotted lines in Fig. 3 to the position shown in full lines in the same figure when pressure is exerted in the cylinder 15.

During the rising of the forks 9 the threads or tubes of each row issuing from the press which were located between one of the rollers 7 and the corresponding rod 8 as shown in line I, II, III, Fig. 3, come into contact with the roller 7 and fold themselves on the corresponding rod 8 (lines I′, II′, III′); said threads or tubes are maintained stretched during the movement of the rods owing to the mounting of these latter on the forks 9, said mounting causing the rods to go away from the point in which the threads or tubes contact with the corresponding roller during their rising (see dotted lines in Fig. 3).

As the rods approach the end of their stroke the cutting mechanism 2 is operated and all the threads or tubes of paste are cut, so that the sections of threads or tubes between rollers 7 and rods 8 fall in the position shown by line I″, II″, and III″ (Fig. 3).

The cutting device may be controlled in any suitable manner, one construction of the controlling device being shown by way of example in Fig. 5, in which 19 is a pinion solid with the shaft 11 and meshing with a pinion 20 loose on its pivot and solid with a disk provided with one tooth 21 capable of engaging the pawl 22 of the wheel 23.

The engagement of the tooth 21 and pawl 22 takes place in its proper moment with regard to the movement of the shaft 11 actuating the fork 9.

The wheel 23 engages with a rack bar 24 controlling the cutters 24′ by means of the arms 24″ (Figs. 2 and 5). As illustrated in said figures after the required rotation of the wheel is effected, the pawl 22 comes in engagement by one of its arms with the shaft 11 so that the tooth 21 is released and the rack bar 24 is forced in its primitive position by a spring 25 acting in the direction of the arrow of Fig. 5.

In order to obtain the threads or tubes to be cut in sections of the same length when they have reached the positions I″, II″, III″ (Fig. 3) a suitable cutter is provided which is controlled by the operation of the fork 9.

In the construction illustrated said cutter comprises a transverse stationary blade 26 and another blade 27 mounted on a rotatable drum 28, which is actuated by means of rack bar 52 engaging a pinion solid with said drum. Said rack is operated by means of a hydraulic pressure cylinder 51 controlled by means of hydraulic devices not shown which are put in operation near the end of the rising of the fork 9 by the rods 10.

In order to properly set the threads or tubes of paste against the stationary blade before they are reached by the blade solid with the rotatable drum 28, a plate 33 extending on the whole width of the row of threads or tubes is provided. This plate is secured to arms 53 pivoted on suitable pivots of the frame 6 which arms are controlled by the cord 29 wound on the drum 29′ and attached by its other end to a bar 30 sliding in the guide 30′ which is pivoted on the frame 6 of the machine. Said bar 30 ends in a hook 31 engaged at the proper time by a projection 32 of the fork 9 (Fig. 1) so that when the arms 10 and 10′ are actuated and the fork 9 moves on the bar 13 the bar 30 and cord 29 are drawn outside and the plate 33 is rotated in position shown in Fig. 3 thus setting the threads or tubes against the stationary blade.

The rods 8 are supplied when required in the forks 9 by means of an automatic apparatus so that the threads or tubes issuing from the dies are always properly set on their rods, which are arranged in the required position before reaching the forks 9.

To this effect a plurality of inclined guides 34 is arranged on the frame of the machine, the number of said guides depending upon the number of rows of rods required. Spare rods are inserted manually in said guides which rods rest against stops projecting inside the guides 34 (Figs. 6–12). Each of these stops comprises two teeth 35, 35′ spaced apart from each other of an extent corresponding to one rod and pivoted on the spindle 36 solid with the finger 37. The fingers 37 corresponding to the stops of the guides 34 are pivoted to a single bar 38 controlled by the angular lever 39 and rod 40; this rod 40 is acted on by a spring 41 and is provided with a tooth 42 intended to engage the projection 43 of the arm 10′.

It is obvious that when the arm 10 or 10′ rotates for effecting the rising of the forks 9, the tooth 42 of the rod 40 engages the projection 43, the bar 38 is moved endwise and the stops 35, 35′ are lowered in each guide so that the next rod passes over the tooth 35 and is stopped by the other one 35′ while in the subsequent stroke the bar 38 is moved in the opposite direction so that the rod is released from the tooth 35' and falls in the lower portion of the guide where it is stopped by the plate 44 the next rod being stopped on the contrary by the tooth 35 which has been raised and so on.

By means of the described arrangement it is obtained that the rods 8 are set in the required position shown in Fig. 6 before the forks 9 have reached their primitive position.

The plates 44 are pivoted on pins 45 and are provided with arms 46 connected to the rod 47 which in turn is connected to the lever 48 provided with a roller 55 and is maintained in a given position by the rod 49 acted on by the spring 50. Said roller 55 is arranged in the path of the fork 9 so that during the return stroke of this latter the arm 48 and the plates 44 are oscillated the rods 8 being thus free to fall in their proper recess of the fork 9.

By means of the apparatus described the rows of threads or tubes issuing from the dies are properly set on the rods by the operation of the hydraulic pressure cylinder 15 as the rod feeding device and the cutters are actuated by the forks 9 which raise the rods and shifts them forward so that the threads or tubes are set automatically on their rods.

The rods having on them the threads or tubes of paste may be removed by hand or otherwise in any suitable way.

What I claim as my invention and desire to secure by United States Letters Patent is:—

1. In an apparatus for arranging long threads or tubes of paste on rods, a plurality of dies arranged in rows from which said threads or tubes issue, means under the dies to guide each row of threads or tubes, rods arranged under the dies each behind one row of threads or tubes, said rods being supported at their ends, carriers at the sides of the apparatus for the ends of said rods, means bearing said carriers and actuating the same to move the rods off from the vertical path of the threads or tubes issuing from the dies, said threads or tubes being bent about the rods when the same are moved off from said vertical path, and means for cutting the two ends of the threads or tubes of paste as the rods approach the end of their stroke.

2. In an apparatus for arranging long threads or tubes of paste on rods, a plurality of dies arranged in rows from which said threads or tubes issue, means under the dies to guide each row of threads or tubes, rods arranged under the dies each behind one row of threads or tubes, said rods being supported at their ends, carriers at the sides of the apparatus for the ends of said rods, means bearing said carriers and actuating the same to move the rods off from the vertical path of the issuing threads or tubes and from the contacting points of the same with the aforesaid guiding means, said threads or tubes being bent about the rods when the same are moved off from said vertical path, and means for cutting the two ends of the threads or tubes of paste as the rods approach the end of their stroke.

3. In an apparatus for arranging long threads or tubes of paste on rods, a plurality of dies arranged in rows from which said threads or tubes issue, means under the dies to guide each row of threads or tubes, rods arranged under the dies each behind one row of threads or tubes, said rods being supported at their ends, carriers at the sides of the apparatus, vertical forks provided on each carrier for the ends of the rods, arms at the ends of which the carriers are pivoted, said arms being so pivoted in the apparatus with regard to the die that their ends, when rising, move off from the contacting points of the threads or tubes of paste with the guiding means, said threads or tubes being bent about the rods when the same are raised, means for preventing the carriers from swinging during their movement and for maintaining the forks in vertical position, and means for cutting the two ends of the threads or tubes of paste when the rods are near the end of their stroke.

4. In an apparatus for arranging long threads or tubes of paste on rods, a plurality of dies arranged in rows from which said threads or tubes issue, means under the dies for cutting the threads or tubes, a rod arranged behind each row of threads or tubes under the cutting means, members for carrying the ends of said rods, means for moving the rod carriers, a shaft connected to said carrier moving means, means for operating said shaft, a gear wheel keyed on said shaft, a pinion meshing with said gear wheel, a pawl capable of engaging a tooth of said pinion during a portion of its stroke, said pawl being mounted on a wheel operating the cutting means.

5. In an apparatus for arranging long threads or tubes of paste on rods, a plurality of dies arranged in rows from which said threads or tubes issue, means under the dies to guide each row of threads or tubes, rods arranged under the dies each behind one row of threads or tubes, carriers at the side of said apparatus, forks provided on each carrier to support the ends of said rods, swinging arms on which said carriers are pivoted, a bar wherewith each carrier is engaged, means for causing said bar to move parallel to itself during the operation of the arms, and means for cutting the two ends of the threads or tubes when the rods approach the end of their stroke.

6. In an apparatus for arranging long threads or tubes of paste on rods, a plurality of dies arranged in rows from which the threads or tubes issue, means under the dies to guide each row of threads or tubes, rods arranged each behind a row of threads or tubes, carriers comprising forks to support the ends of said rods, swinging arms on which said carriers are pivoted, a sleeve solid with each carrier, a bar on which each sleeve slides, arms symmetrical with said swinging arms and swinging in opposite directions, a sleeve pivoted on each arm and sliding on said bar during the operation of the arms, and means for cutting the two ends of the threads or tubes when the arms are near the end of their stroke.

7. In an apparatus for arranging long threads or tubes of paste on rods, a plurality of dies arranged in rows from which the threads or tubes issue, means under the dies to cut the threads or tubes, rods arranged under said cutting means each behind one row of threads or tubes, members carrying the ends of said rods, swinging arms to which said members are pivoted, and means for operating the swinging arms said means controlling the cutting means when said arms approach the end of their stroke.

8. In an apparatus for arranging long threads or tubes of paste on rods, a plurality of dies arranged in rows from which the threads or tubes issue, means under the dies to cut the threads or tubes, rods arranged under the cutting means, each behind one row of threads or tubes, members carrying the ends of said rods, swinging arms to which said members are pivoted, a shaft solid with said arms, means for operating said shaft, a gear wheel solid with said shaft, a pinion meshing with said gear wheel, a pawl adapted to engage a tooth of said pinion during a portion of its stroke, said pawl being mounted on a wheel which operates the cutting means.

9. In an apparatus for arranging long threads or tubes of paste on rods, a plurality of dies arranged in rows from which the threads or tubes issue, means under the dies to cut the threads or tubes, rods arranged under the cutting means each behind one row of threads or tubes, members carrying the ends of said rods, swinging arms to which said members are pivoted, means for operating said arms and cutting means, a transverse blade mounted on a rotary member in correspondence with the ends of the threads or tubes arranged on the rods, a transverse rotatable plate preceding said blade in its rotation, and means for operating in succession said plate and rotary member to cut the ends of the threads or tubes.

10. In an apparatus for arranging long threads or tubes of paste on rods, a plurality of dies arranged in rows from which the threads or tubes issue, rods arranged under the dies each behind one row of threads or tubes, means at the sides of the apparatus for carrying said rods and raising them forward, guides in which the spare rods are inserted, said guides terminating above the rod carriers, stops in each guide for releasing a single rod at a time, means for controlling said stops when the rod carriers approach the end of their stroke, plates at the end of the guides for retaining the rods, a member connected to said plates and actuated by the rod carriers for moving off said plates, and means for cutting the two ends of the threads or tubes.

In testimony whereof I affix my signature in presence of two witnesses.

PILADE BARDUCCI.

Witnesses:
   INCOLA GURONNE,
   WILLIAM GERGIROB.